United States Patent [19]

Komiya et al.

[11] Patent Number: 5,335,075
[45] Date of Patent: Aug. 2, 1994

[54] IMAGE SENSING APPARATUS HAVING EXPOSURE LEVEL AND DYNAMIC RANGE CONTROL CIRCUIT

[75] Inventors: Yasuhiro Komiya; Takeshi Mori, both of Tokyo; Tatsuo Nagasaki, Yokohama, all of Japan

[73] Assignee: Olympus Optical Co., Ltd., Tokyo, Japan

[21] Appl. No.: 23,087

[22] Filed: Feb. 26, 1993

Related U.S. Application Data

[63] Continuation of Ser. No. 771,433, Oct. 4, 1991, Pat. No. 5,264,940.

[30] Foreign Application Priority Data

Oct. 8, 1990 [JP] Japan .................. 2-269916
Aug. 26, 1991 [JP] Japan .................. 3-213706

[51] Int. Cl.[5] .............................. H04N 5/238
[52] U.S. Cl. ............................ 348/298; 348/364
[58] Field of Search ......... 358/228, 209, 909, 213.19; 354/410; H04N 5/238, 5/225

[56] References Cited

U.S. PATENT DOCUMENTS

| | | | |
|---|---|---|---|
| 4,580,168 | 4/1986 | Levine | 358/213.16 |
| 4,623,927 | 11/1986 | Hoshino | 358/213.19 |
| 4,635,126 | 1/1987 | Kinoshita | 358/228 |
| 4,638,367 | 1/1987 | Sakane et al. | 358/228 |
| 4,779,137 | 10/1988 | Tojo et al. | 358/213.11 |
| 4,825,291 | 4/1989 | Mimura et al. | 358/213.29 |
| 4,833,541 | 5/1989 | Takuma et al. | 358/227 |
| 4,839,729 | 6/1989 | Ando | 358/213.16 |
| 4,841,366 | 6/1989 | Katagiri et al. | 358/167 |
| 4,849,813 | 7/1989 | Hirao et al. | 358/137 |
| 4,868,645 | 9/1989 | Kobayashi | 358/98 |
| 4,884,142 | 11/1989 | Suzuki | 358/213.19 |
| 4,926,247 | 5/1990 | Nagasaki et al. | 358/43 |
| 4,969,045 | 11/1990 | Haruki et al. | 358/228 |
| 4,984,002 | 1/1991 | Kokubo | 358/213.13 |
| 5,049,997 | 9/1991 | Arai | 358/213.11 |

FOREIGN PATENT DOCUMENTS

| | | | |
|---|---|---|---|
| 2-50584 | 2/1990 | Japan | H04N 5/335 |
| 3-224368 | 10/1991 | Japan | H04N 5/248 |
| 3-224372 | 10/1991 | Japan | H04N 5/335 |

OTHER PUBLICATIONS

T. Nakamura, K. Matsumoto, R. Hyuga and A. Yusa, "A New MOS Image Sensor Operating in a Non-Destructive Readout Mode", 1986, pp. 353–356, published by IEEE, (1986).

Primary Examiner—Michael T. Razavi
Assistant Examiner—Tuan V. Ho
Attorney, Agent, or Firm—Frishauf, Holtz, Goodman & Woodward

[57] ABSTRACT

In the exposure control circuit of an image input device according to the present invention, the rays of light from the subject pass through a diaphragm adjusting the amount of light and undergoes photoelectric conversion at a CCD imaging element. The image signal read from the CCD imaging element is accumulated more than once at an accumulating circuit. The luminance of the subject is detected at a luminance detector. Based on the detected luminance, a condition setting circuit sets the amount of incident light, exposure time, and the number of additions to suitable values. With those suitable settings, the amount of light through the diaphragm, the exposure time of the CCD imaging element, and the number of accumulations by the accumulating circuit are controlled so as to enable the subject to be photographed under the best condition.

2 Claims, 19 Drawing Sheets

|  |  | STATE (i) $DR \leqq DR1$ |  | STATE (ii) $DR \leqq DR2$ |  |
|---|---|---|---|---|---|
| MODE A | n | $n1$ |  | $n2$ |  |
|  | F | F1 |  | Fmin |  |
|  | T | Tmin |  | T2 |  |
| MODE B | n | $n_C \geqq n1$ | $n_C < n1$ | $n_C \geqq n2$ | $n_C < n2$ |
|  | F | T-DEPENDENT F | F1 | T-DEPENDENT F | Fmin |
|  | T | LARGEST T MEETING $n_C$ | Tmin | LARGEST T MEETING $n_C$ | T2 |
| MODE C | n | SMALLEST n MEETING T |  | SMALLEST n MEETING T |  |
|  | F | T-DEPENDENT F |  | T-DEPENDENT F |  |
|  | T | LARGEST T ON DR |  | LARGEST T ON DR |  |

FIG. 12

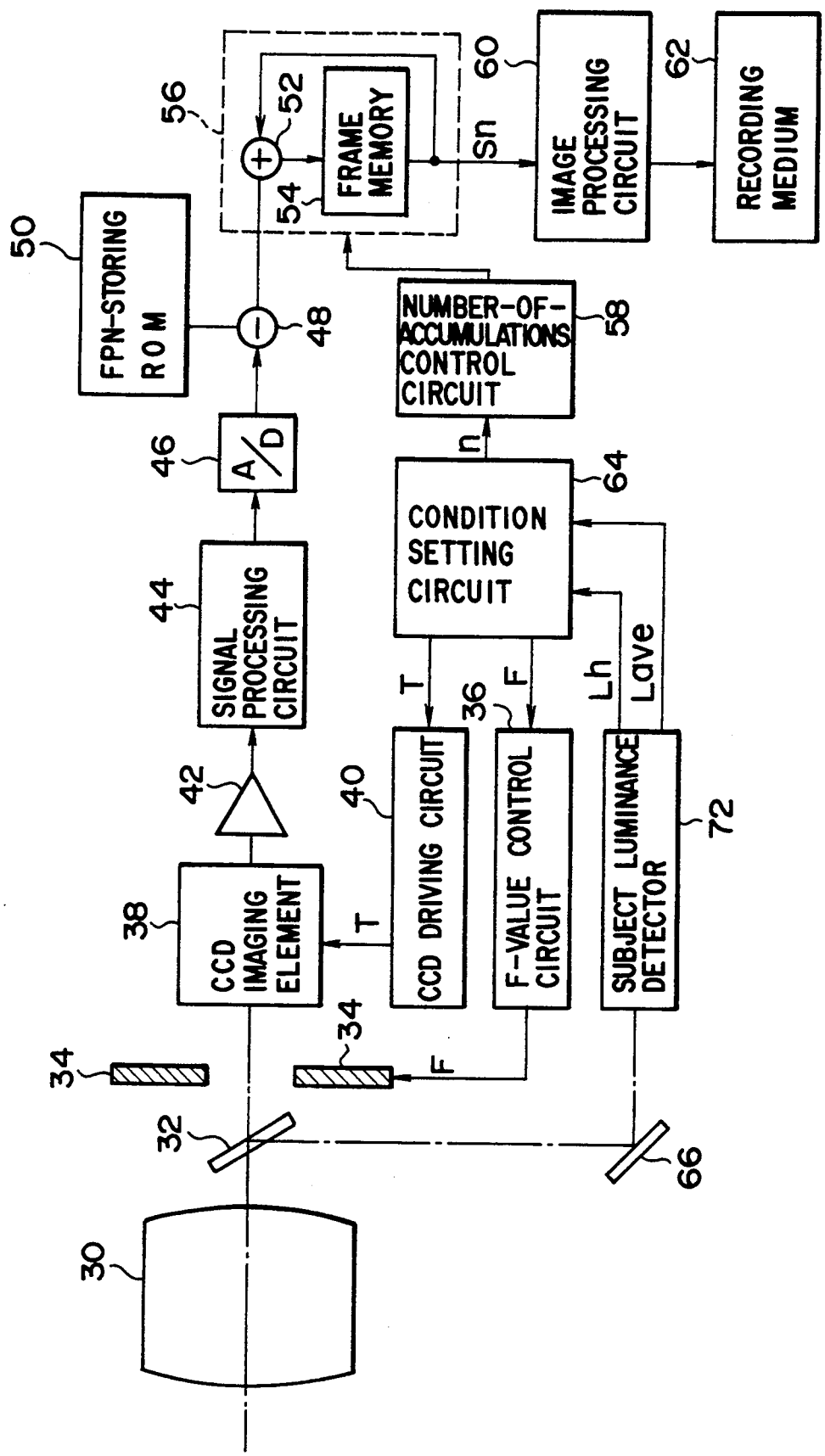
F I G. 13

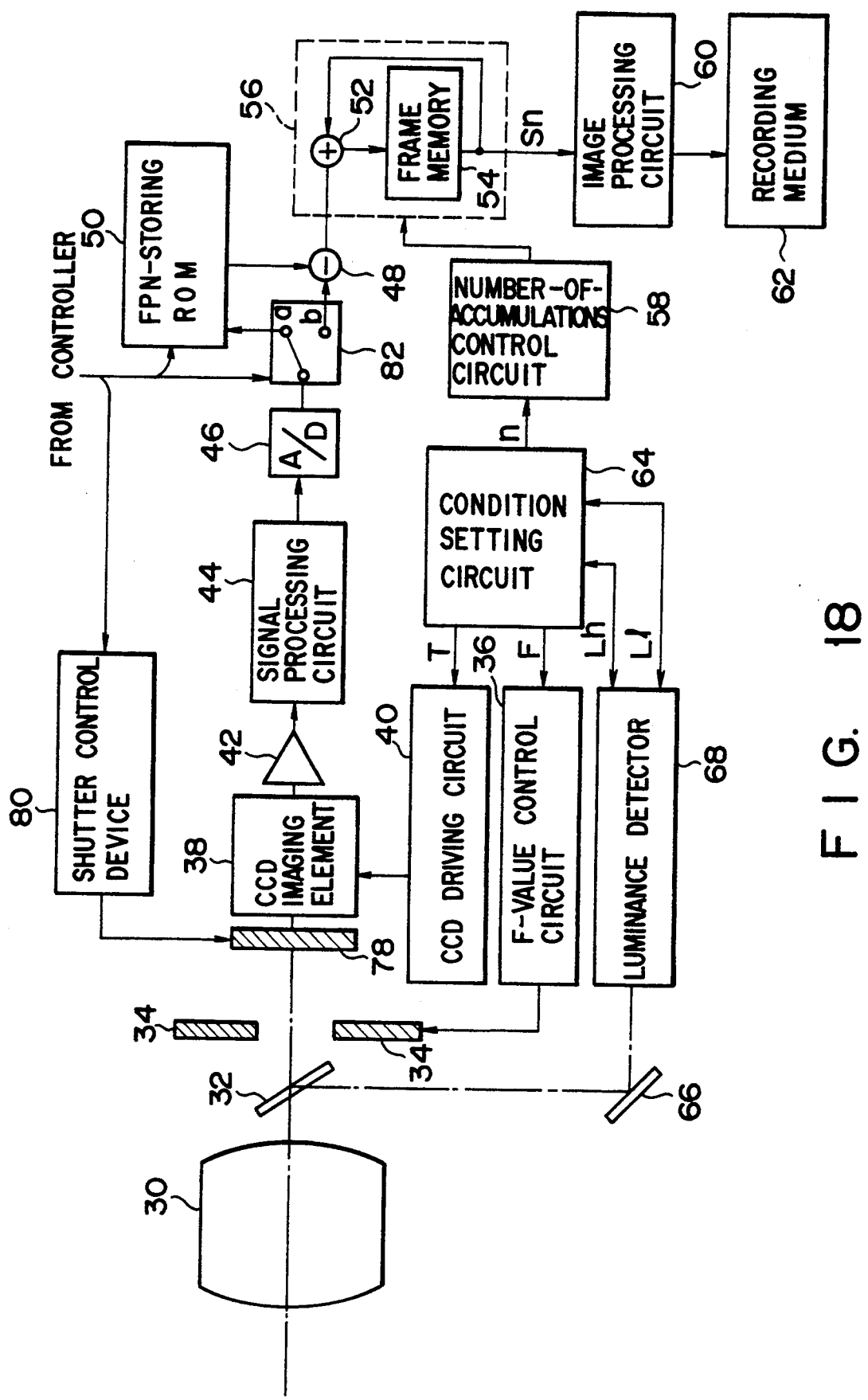
F I G. 18

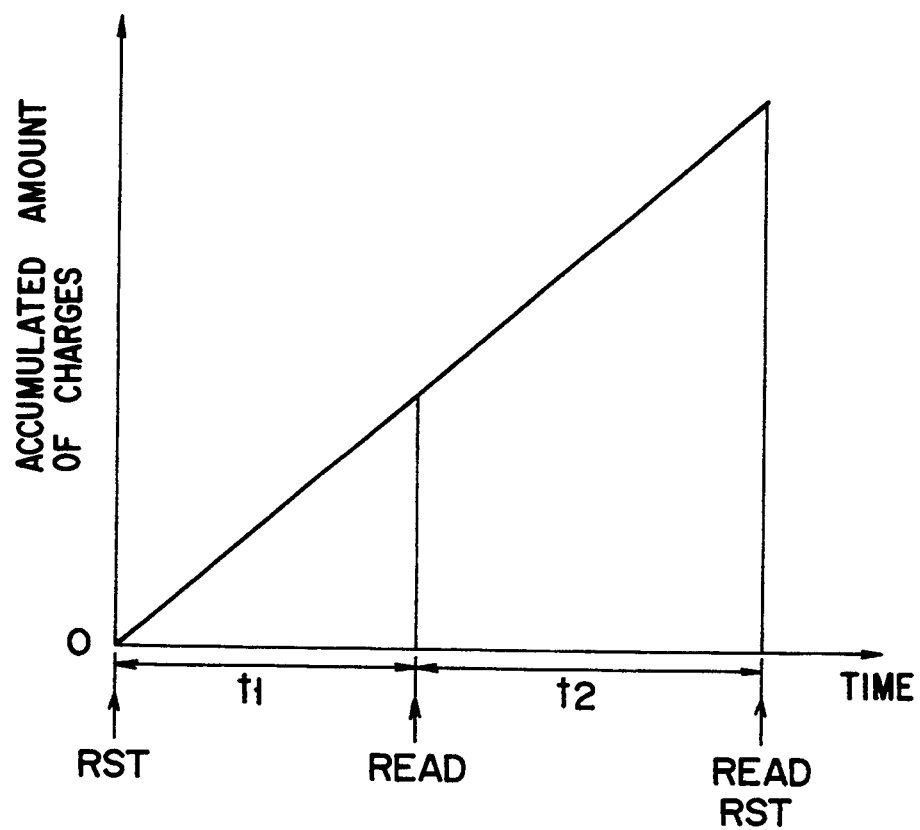
F I G. 21

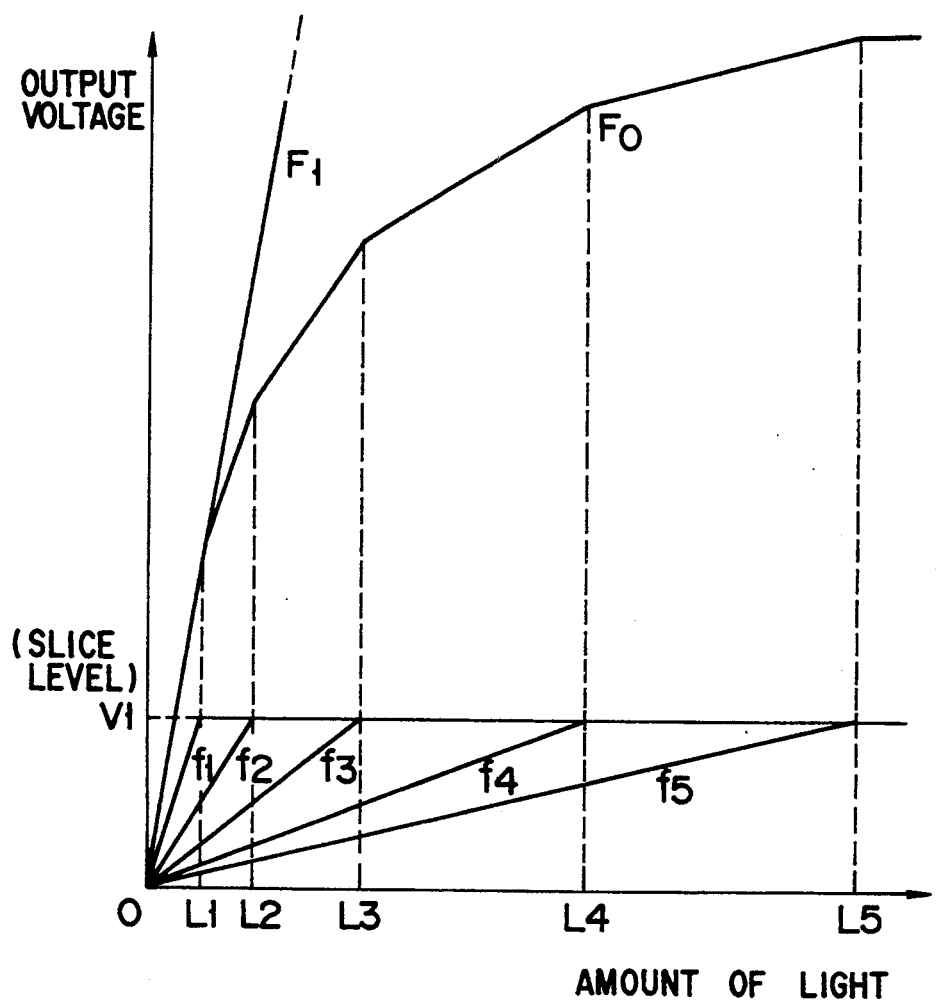
F I G. 22

IMAGE SENSING APPARATUS HAVING EXPOSURE LEVEL AND DYNAMIC RANGE CONTROL CIRCUIT

This is a continuation of application Ser. No. 07/771,433, filed Oct. 4, 1991, now U.S. Pat. No. 5,264,940.

BACKGROUND OF THE INVENTION

1. Field of the Invention

This invention relates to an image input device such as an electronic camera using accumulation, and more particularly, to an exposure control circuit of an image input device that speeds up the photographing of a subject having a wide dynamic range.

2. Description of the Related Art

Recently, various solid-state imaging elements including CCD image sensors and MOS image sensors have been developed. Those solid-state imaging elements have found application to a variety of image input devices such as electronic cameras.

While some subjects often have a dynamic range as wide as about 80 dB, solid-state imaging elements generally have an imaging capability (a dynamic range) of up to about 50 dB. Therefore, with such solid-state imaging elements, it is impossible to photograph a subject with a wider dynamic range than 50 dB. For ranges wider than 50 dB, the output of the imaging element can be saturated in the high luminance region, causing what is called white compression, or be short of exposure in the low luminance region, creating a blacked-out portion in the image.

To overcome those disadvantages, Japanese Patent Application No. 1-334508 discloses a device that broadens the dynamic range by accumulating the image signal from the solid-state imaging element. FIG. 1 is a schematic diagram for an important part of the disclosed device.

In the FIG. 1, the image signal read at a high speed from the solid-state imaging element (AMI) 2, which electrically images the subject (not shown), is amplified to a specified signal level at the preamplifier 4. The amplified signal undergoes various processes including clipping at the signal processing circuit 6 and is digitized at the A/D converter 8. The digitized image signal is supplied via the adder 10 to the frame memory 12, which, together with the adder 10, carries out accumulation and stores the resulting signal in frames sequentially.

The video processor 14 extracts the luminance signal component Y from the accumulated image signal having an extended dynamic range and at the same time, divides the rest of the signal into the three primary color components R, G, and B. The luminance signal component Y is log-converted into log Y at the log amplifier 16a of the dynamic range control circuit 16. The resulting signal is supplied via the two-dimensional filter 16b, which eliminates luminance irregularities, to the dynamic range gain controller (DGC) 16c. This controller 16c adjusts the dynamic range of the luminance signal component Y to that of the image monitor and supplies the output to the adder 16e, which also receives the output from the log amplifier via the delay circuit 16d. The adder 16e calculates the compression coefficient of the dynamic range.

On the other hand, the three primary color components R, G, and B are log-converted into log R, log G, and log B at the log amplifiers 18r, 18g, and 18b, respectively. These resulting signals are supplied via the delay circuits 20r, 20g, and 20b to the adders 22r, 22g, and 22b, respectively. These adders 22r, 22g, and 22b add the compression coefficient to the inputs. The resulting signals undergo reverse conversion at the reverse log amplifiers 24r, 24g, and 24b and then are supplied to D/A converters 26r, 26g, and 26b, which produce the signal components whose dynamic range is compressed.

Making use of the fact that accumulation of the signal reduces random noises, the device thus constructed provides a wide dynamic range.

For such a device, however, there is no detailed description of the relationship between the number of accumulations by the solid-state element and the exposure time. If the number of accumulations is n, the signal value will be n times larger and the noise value $n^{\frac{1}{2}}$ times larger, so that the imaging dynamic range can be increased up to $n^{\frac{1}{2}}$ times. That is: i) the more the number of accumulations increases, the wider the dynamic range, but the longer the time required for photographing becomes; ii) when the subject to be photographed has a narrow dynamic range, unnecessary accumulations prolongs photographing time wastefully; and iii) when the subject with a high luminance is photographed, it is necessary to shorten the exposure time of the solid-state imaging element, whereas when the subject with a low luminance is photographed, it is necessary to lengthen the exposure time. Therefore, the number of accumulations and the exposure time had to be set to suitable values depending on the dynamic range and luminance of the subject to be photographed.

Published Unexamined Japanese Patent Application No. 63-201406 discloses a device for controlling exposure time. This device, using a nondestructive sensor, reads image data at a high speed and stores more than one image with different exposure times during one exposure period.

With such a device, however, while the exposure time is controlled, the exposure is not controlled to a suitable amount by a diaphragm as with the prior art described above. Namely, the exposure time is controlled depending on the state of the subject, but for a dark subject, the exposure time tends to be longer than necessary.

SUMMARY OF THE INVENTION

Accordingly, the object of the present invention is to provide an exposure control circuit for use in an image input device, which enables the photographer to set the most suitable photographing condition in accordance with the dynamic range and luminance of the subject to photograph.

The foregoing object is accomplished by providing an exposure control circuit of an image input device that produces an electronic image input of the subject using a solid-state imaging element, comprising: light-amount adjusting means for adjusting the amount of incident light from the subject; solid-state imaging element means allowing the reading of image signals to produce the electronic image input of the subject and the control of exposure time; accumulating means for accumulating the image signal read from the solid-state imaging element means; number-of-additions control means for controlling the number of additions by the accumulating means; and condition setting means for setting the light-amount adjusting means, solid-state imaging element means, and number-of-additions control means so as to selectively determine the amount of incident light, exposure time, and the number of additions according to the luminance of the subject or the conditions to be set.

The foregoing object is also accomplished by an exposure control circuit of an image input device that produces an electronic image input of the subject using a solid-state imaging element, comprising: light-amount adjusting means for adjusting the amount of incident light from the subject; solid-state imaging element means allowing the reading of image signals in a nondestructive manner to produce the electronic image input of the subject and the control of read timing; accumulating means for accumulating the image signal read in a nondestructive manner from the solid-state element means; number-of-additions control means for controlling the number of additions by the accumulating means; condition setting means for setting the light-amount adjusting means, solid-state imaging element means, and number-of-additions control means so as to selectively determine the amount of incident light, exposure time, and the number of additions according to the luminance of the subject or the conditions to be set; and converting means for converting the accumulated data into a linear signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 illustrates the most suitable relationship between each condition of FIG. 10B and the photographing mode;

FIG. 13 is a block diagram showing an electronic camera having an exposure control circuit according to a second embodiment of the present invention;

FIG. 18 is a block diagram showing an electronic camera having an exposure control circuit according to a fourth embodiment of the present invention;

FIG. 21 shows the relationship between the accumulated amount of charges and the exposure time of the electronic camera of FIG. 20;

FIG. 22 illustrates the relationship between the output voltage and the amount of light of the electronic camera of FIG. 20.

DETAILED DESCRIPTION OF THE PREFERRED EMBODIMENTS

Referring to the accompanying drawings, embodiments of the present invention will be explained.

Figure 2:
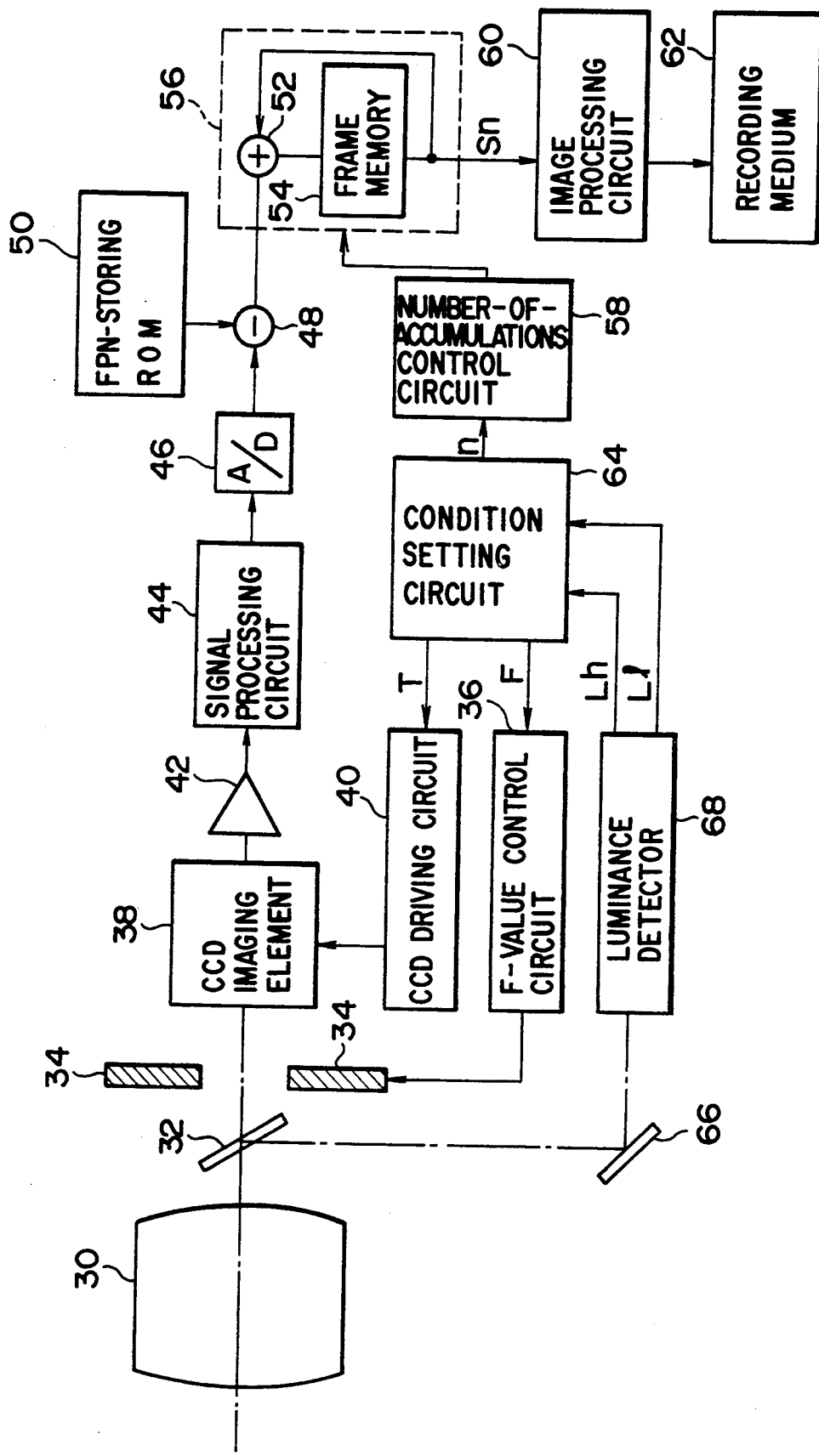
FIG. 2 is a block diagram showing an electronic camera having an exposure control circuit of an image input device according to the present invention.

FIG. 2 is an overall block diagram of an electronic camera to which an exposure control circuit of an image input device according to the present invention is applied. In the figure, numeral 30 indicates the optical system for photographing. The amount of light coming from the optical system 30 via a half mirror 32 is adjusted by an aperture 34, whose opening F-value is controlled by an F-value control circuit 36.

The input image passing through the aperture 34 is electrically imaged at a CCD imaging element 38 having random noise explained later. The read operation and exposure time T of the CCD imaging element 38 are controlled by a CCD driving circuit 40. The image signal from the CCD imaging element 38 is amplified to a specified signal level at a preamplifier 42 and undergoes signal processes including clipping at a signal processing circuit 44. The resulting signal is converted into a digitized image signal at an A/D converter 46 and then supplied to a subtracter 48. The subtracter 48 eliminates from the digitized image signal the fixed pattern noise (FPN) of the CCD imaging element 38 previously stored in an FPN-storing ROM 50.

The image signal, from which FPN has been removed at the subtracter 48, is supplied to an adder 52, the output of which is then supplied to a frame memory 54 that stores the input in frames sequentially. An accumulating circuit 56 is composed of the adder 52 and frame memory 54 and the number of accumulations by the circuit 56 is controlled by a number-of-accumulations control circuit 58. The signal Sn accumulated at the accumulating circuit 56 undergoes various processes including luminance conversion and encoding at an image processing circuit 60, and then is written in a recording medium 62.

The F-value control circuit 36, CCD driving circuit 40, and number-of-accumulations control circuit 58 are controlled by a condition setting circuit 64, which is made up of, for example, a microprocessor. The condition setting circuit 64 controls the F-value of the aperture 34, the exposure time T of the CCD imaging element 38, and the number of accumulations n by the accumulating circuit 56 on the basis of the maximum luminance Lh and minimum luminance L1 of the subject sensed at a luminance detector 68, which receives part of the light from the subject via a half mirror 32 and a total reflection mirror 66.

Figure 3:
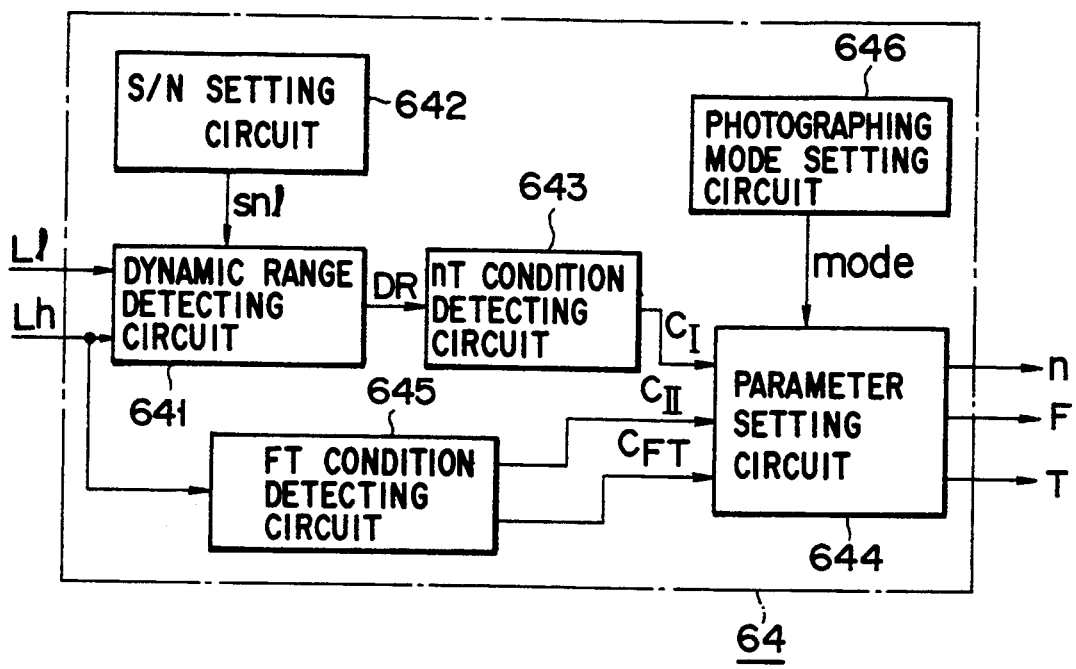
FIG. 3 is a detailed block diagram for the condition setting circuit of FIG. 2.

FIG. 3 illustrates the condition setting circuit 64 of FIG. 2 in detail. The maximum luminance Lh and minimum luminance L1 of the subject supplied from the luminance detector 68 are supplied to a dynamic range detecting circuit 641. The dynamic range detecting circuit 641 senses an imaging dynamic range DR on the basis of the S/N ratio snl (dB) for the subject of the minimum luminance L1 set at an S/N setting circuit 642 as well as the maximum luminance Lh and minimum luminance L1. The dynamic range DR thus sensed is supplied to an nT condition detecting circuit 643, which calculates restrictive condition I for the number of accumulations n and the exposure time T to determine them and then supplies the result as condition $C_I$ to a parameter setting circuit 644.

The maximum luminance Lh is supplied to an FT condition sensing circuit 645, which calculates restrictive condition II for the F value and exposure time T and then supplies the result as condition $C_{II}$ to the parameter setting circuit 644. The FT condition detecting circuit 645 also supplies a state signal $C_{FT}$ (explained in detail later) of the F and T conditions to the parameter setting circuit 644.

The parameter setting circuit 644 receives from an photographing mode setting circuit 646 the following mode signal, for example:

Mode 1: shorten exposure time to a minimum
Mode 2: keep exposure time constant
Mode 3: deepen the depth of field to a maximum The parameter setting circuit 644 calculates the most suitable diaphragm opening F, the exposure time T, and the number of accumulations n on the basis of the mode thus set as described above, conditions $C_I$ and $C_{II}$, and state signal $C_{FT}$.

Figure 4:
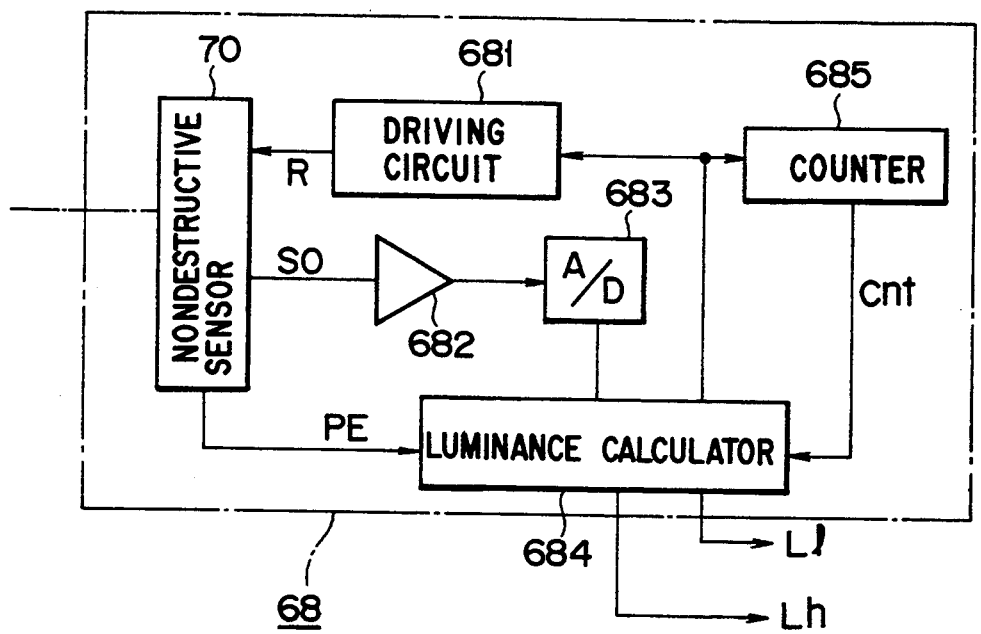
FIG. 4 is a detailed block diagram for the luminance detector of FIG. 2.

FIG. 4 gives a detailed illustration of the luminance detector 68 of FIG. 2. The incident rays of light from the subject via the half mirror 32 and full reflection mirror 66 are introduced into a nondestructive sensor 70, which comprises a line sensor driven by a driving circuit 681. The image signal SO electrically read at the nondestructive sensor 70 is amplified at a preamplifier 682, converted into a digitized signal at an A/D converter 683, and then supplied to a luminance calculator 684. The nondestructive sensor 70 supplies a peak-value signal PE to the luminance calculator 684, the output of which is supplied to both the driving circuit and a counter 685. The luminance calculator 684 also calculates the maximum luminance Lh and minimum luminance L1 on the basis of the output of the A/D converter 683, the peak-value signal PE, and the number of counts Cnt from the counter 685.

Figure 5:
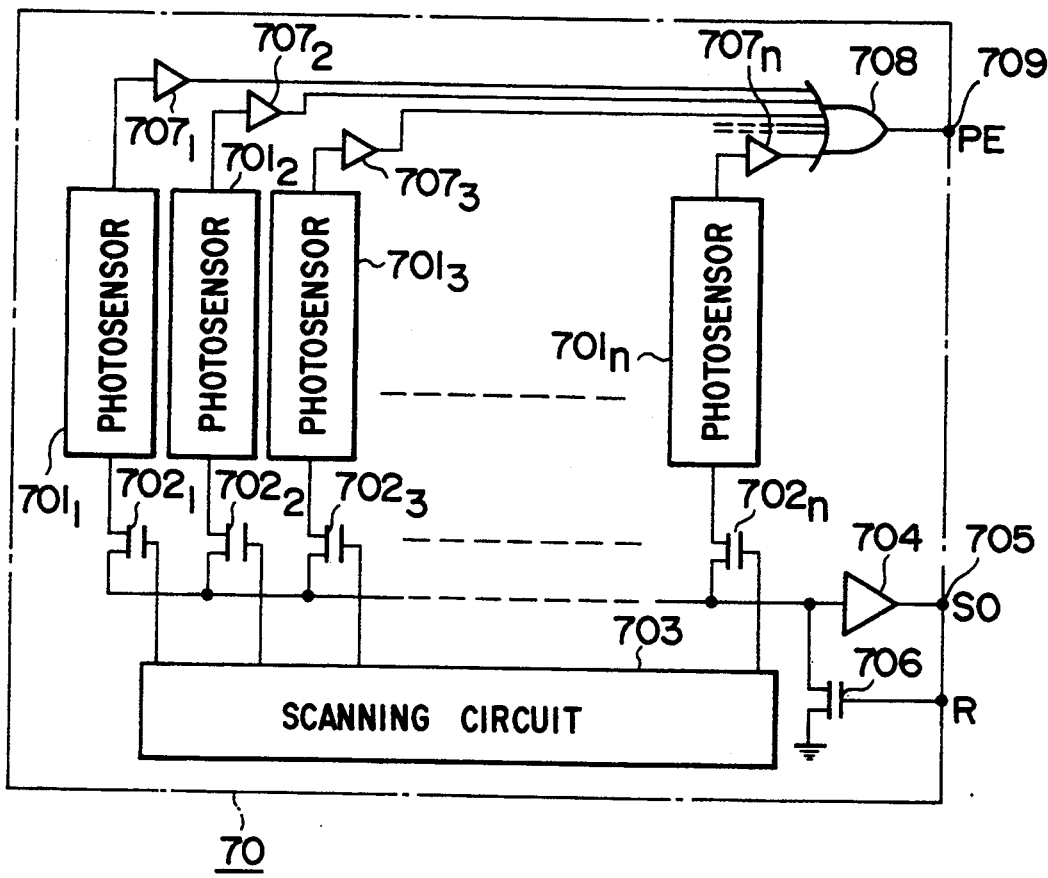
FIG. 5 is a detailed block diagram for the nondestructive sensor of FIG. 4.

FIG. 5 illustrates the configuration of the nondestructive sensor 70 of FIG. 4, which contains a plurality of non-destructive read photosensors $701_1, \ldots, 701_n$. These photosensors $701_1, \ldots, 701_n$ are connected to a scanning circuit 703 via read switches $702_1, \ldots, 702_n$. The image signal read by the scanning circuit 703 is supplied as the image signal 80 via an output amplifier 704 at the terminal 705. In the figure, numeral 706 indicates a reset switch.

The photosensors $701_1, \ldots, 701_n$ are connected to a peak detecting section 708 via buffer amplifiers $707_1, \ldots, 707_n$. The peak detecting section 708 senses the peak value and supplies it as the peak-value signal PE at the terminal 709.

Noises of the solid-state imaging element will now be explained.

Figure 6:
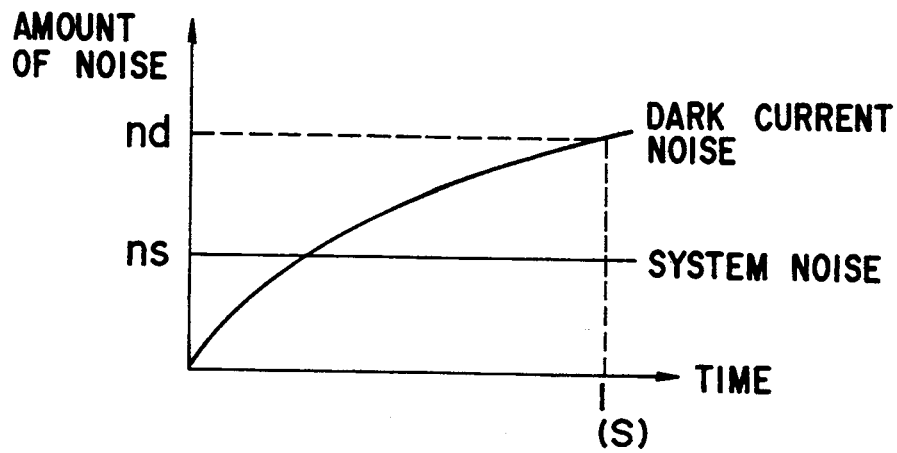
FIG. 6 shows the change of random noise with respect to time.

The solid-state imaging element creates various noises. Those noises can be divided broadly into two types: fixed pattern noises (FPN) and random noises. Of them, random noises ($N_R$) can be reduced relatively by accumulating the image signals. Random noises are further divided into two types of noises: dark current noises ($N_D$), which is dependent on exposure time, and system noises ($N_S$), which is independent of exposure time. These two types of noises vary as shown in FIG. 6, for example.

Here, noise will be considered provided that the number of accumulations is n and the exposure time of the solid-state imaging element is T. In this case, the total exposure time $t_B$ will be expressed as nT. The dark current noise $N_D$ with no accumulation is expressed as equation (1):

$$N_D = n_d \sqrt{T} \tag{1}$$

When n accumulations take place, it is expressed as equation (2):

$$N_D = \sqrt{(n_d \sqrt{T})^2 \cdot n} \tag{2}$$
$$= n_d \sqrt{Tn}$$

When system noise N S is accumulated n times, the result will be:

$$N_S = \sqrt{n_s^2 \cdot n} \tag{3}$$
$$= n_s \sqrt{n}$$

The random noise $N_R$ will be expressed as:

$$N_R = \sqrt{N_D^2 + N_S^2} \tag{4}$$
$$= \sqrt{n_d^2 Tn + n_s^2 n}$$
$$= \sqrt{(n_d^2 Tn + n_s^2)n}$$

If the maximum value of the amplitude of the signal is S, the maximum level for the signal accumulated n times will be nS. Thus, the imaging dynamic range DR will be expressed as:

$$DR(n,T) = 20 \log_{10} \frac{nS}{N_R} \quad (5)$$

$$= 20 \log_{10} \frac{nS}{\sqrt{(n_d^2 Tn + n_s^2)n}} \text{ [dB]}$$

It should be noticed that in this case, consideration is given only to random noise.

Figure 7:
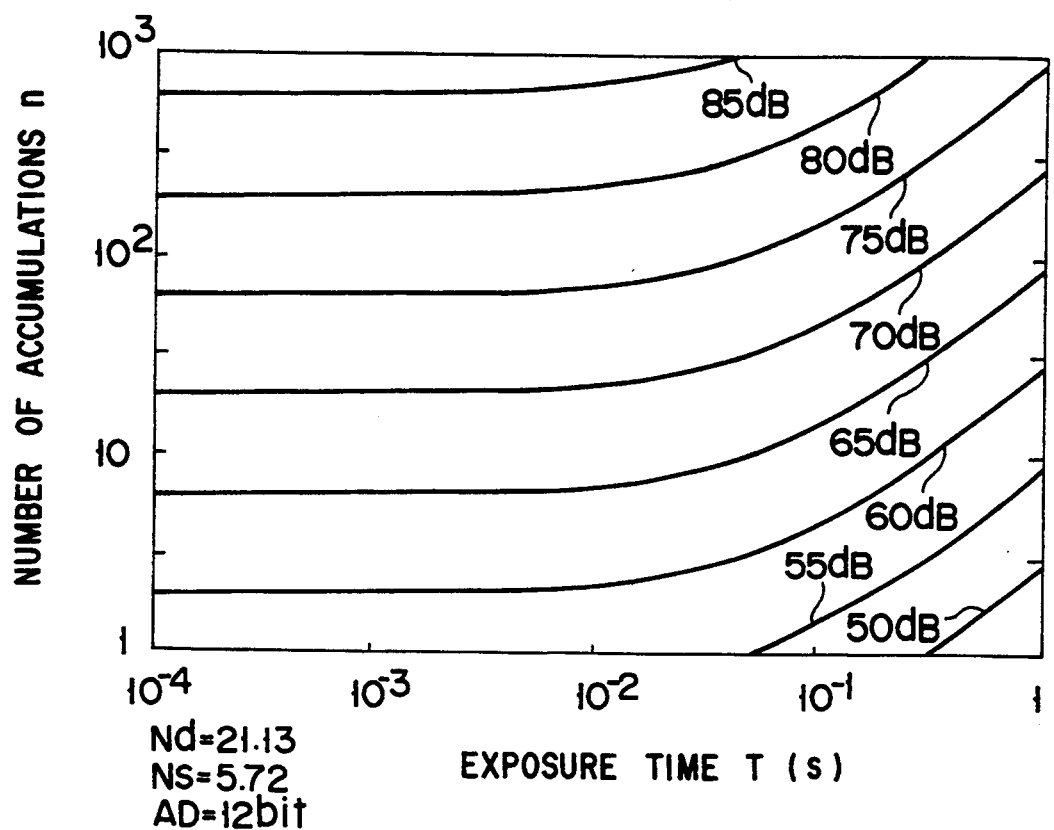
FIG. 7 shows the relationship between the number of accumulations and the exposure time.

Equation (5) is represented on a graph in FIG. 7. In the figure, both the the ordinate and the abscissa are expressed in logarithms. From equation 5, equations (6) hold:

$$n_d = 21.13(1/\sqrt{S}) \quad (6)$$
$$N_S = 5.72$$
$$S = 2^{12} - 1$$

From FIG. 7, it is possible to determine the exposure time and the number of accumulations required to calculate the necessary dynamic range.

In obtaining a certain dynamic range, more than one combination of exposure time T and the number of accumulations n can be considered. The exposure time T, however, is determined by the luminance of the subject and the F number of the photography optical system. That is, if the maximum luminance of the subject that allows photographing without saturation is $L_{max}$, it will be expressed as:

$$L_{max} = k \frac{F^2}{T} \text{ [cd/m}^2\text{]} \quad (7)$$

where k is a constant associated with the sensitivity of the imaging element and others. Contrarily, if the minimum luminance of the subject that can be photographed without saturation is $L_{min}$, it will be expressed as:

$$L_{min} = \frac{L_{max}}{10^{DR/20}} \quad (8)$$
$$= \frac{kF^2}{T \cdot 10^{DR/20}}$$

where $L_{min}$ is the noise level. DR in equation (8) represents DR (n,T) in equation (5).

It is assumed that the luminance of the subject to be photographed ranges from the minimum luminance L1 [cd/m²] to Lh [cd/m²] where L1<Lh. Under this assumption, if the dynamic range of the subject is dr, then it will be expressed as:

$$dr = 20 \log_{10} \frac{Lh}{L1} \text{ [dB]} \quad (9)$$

The dynamic range DR required to assure snl [dB] as the S/N ratio for the minimum luminance L1 is represented as:

$$DR = dr + snl \text{ [dB]} \quad (10)$$

In this case, the S/N ratio for the subject with the maximum luminance Lh will be DR [dB]. For conditions required to photograph without saturating the maximum luminance Lh, expression (11) must hold:

$$Lh \leq L_{max} \quad (11)$$

Based on equation (7) and expression (11), the exposure time T and F number that fulfill expression (12) may be selected, and from equation (5), the number of accumulations may be determined:

$$Lh \leq k \frac{F^2}{T} \quad (12)$$

The operation of the embodiment will now be described.

Figure 8:
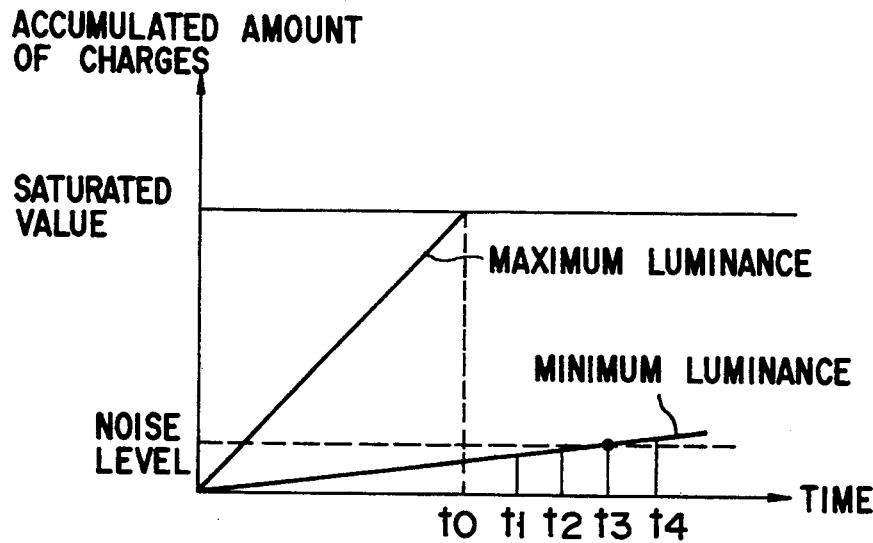
FIG. 8 illustrates the accumulated amount of charges in the nondestructive sensor with respect with time.

When photographing starts, the luminance detector 68 first calculates the maximum luminance Lh and minimum luminance L1 of the subject to be photographed. Specifically, referring to FIG. 4, when luminance detection starts, the nondestructive sensor 70 is reset and at the same time, the counter 685 is set to zero. Then, when the exposure of the nondestructive sensor 70 begins, the counter 685 starts simultaneously. When the peak-value signal PE reaches the saturated value after a period of time $t_0$ as shown in FIG. 8, the maximum luminance Lh is obtained on the basis of the count $Cnt_0$ at that time.

The minimum value of the image signal indicates the minimum luminance. When the minimum value is below the noise level determined by the S/N ratio of the non-destructive sensor 70, exposure still continues. The signal is read at regular intervals of time (e.g., time $t_1, t_2, \ldots$ ) and the minimum luminance L1 is calculated on the basis of the count ($Cnt_3$ in this case) for the time (time $t_3$) when the minimum luminance L1 exceeds the noise level.

With this operation, the maximum luminance Lh and minimum luminance L1 can be determined accurately even when the dynamic range dr of the subject is larger than the S/N ratio of the nondestructive sensor 70.

Once the luminance detector 68 has obtained the maximum luminance Lh and minimum luminance L1, it supplies these luminances Lh and L1 to the dynamic range detecting circuit 641 of the condition setting circuit 64. The dynamic range detecting circuit 641 first calculates the dynamic range dr of the subject based on equation (9). It then calculates the dynamic range DR required for photographing, using equation (10), on the basis of the dynamic range dr of the subject and the S/N ratio snl required for the subject with the minimum luminance set at the S/N setting circuit 642. Receiving the dynamic range DR, the nT condition detecting circuit 643 calculates the restrictive condition I represented by expression (13), using equation (5), and then supplies the results as condition $C_I$ to the parameter setting circuit 644:

$$20 \log_{10} \frac{nS}{\sqrt{(n_d^2 T + n_s^2)n}} \geq DR \quad (13)$$

On the other hand, the FT condition detecting circuit 645 calculates the condition II represented by equation (14) required to photograph the subject of the maximum luminance Lh, while ensuring the imaging dynamic range DR, and then supplies the results as the condition $C_{II}$ to the parameter setting circuit 644:

$$\frac{F^2}{T} = \frac{Lh}{k} \quad (14)$$

Figure 9A:
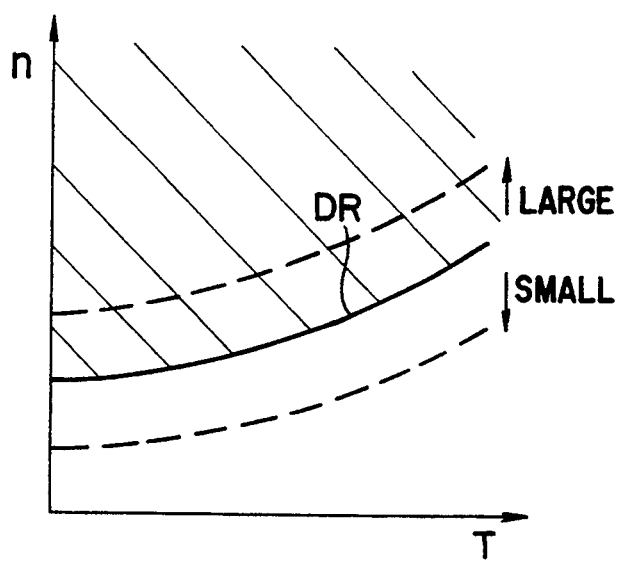
FIG. 9A shows condition $C_I$ corresponding to the restrictive condition I calculated at the nT condition detecting.
Figure 9B:
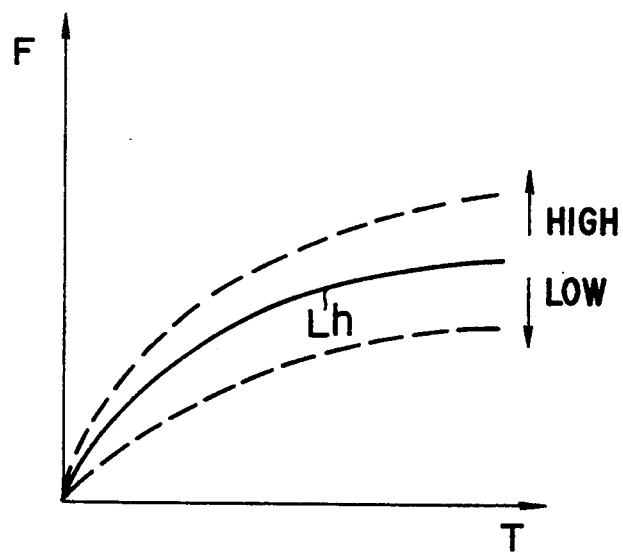
FIG. 9B shows condition $C_{II}$ corresponding to the restrictive condition II obtained at the FT condition setting circuit.

FIGS. 9A and 9B show examples of conditions $C_I$ and $C_{II}$. The shaded portion larger than the dynamic range DR in FIG. 9A and the solid line Lh in FIG. 9B fulfill the conditions $C_I$ and $C_{II}$, respectively. Therefore, the number of accumulations n, diaphragm opening F, and exposure time T should be set to meet those conditions. More than one combination of these three factors can be considered and it is important to select the most suitable one among them.

Assuming that the exposure time T can vary continuously in the range of $T_{min}$ to $T_{max}$, the number of accumulations n can take an integer ranging from 1 to $n_{max}$, and the diaphragm opening can take a continuous value ranging from $F_{min}$ to $F_{close}$ (no amount of incident rays of light).

Figure 10A:
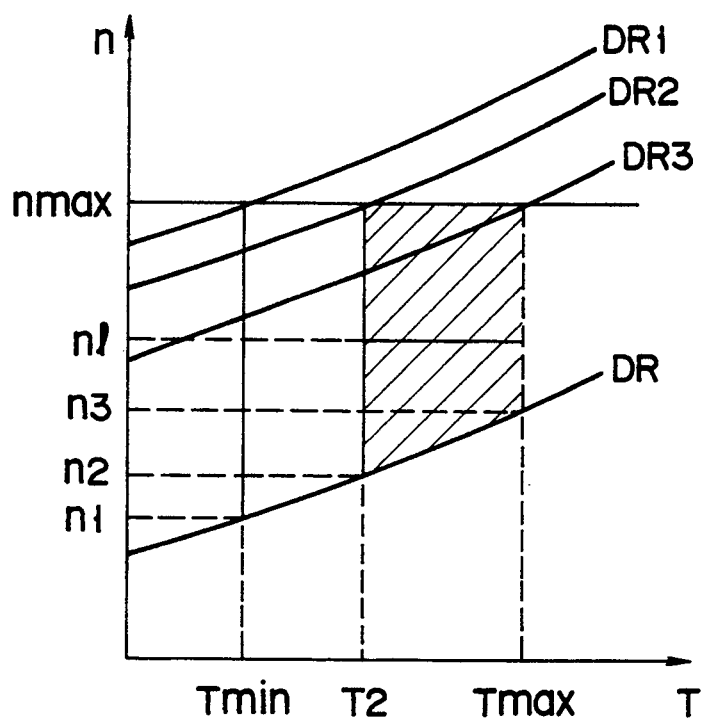
FIGS. 10A and 10B illustrate various combinations of the number of accumulations, the diaphragm opening, and the exposure time corresponding to conditions $C_I$ and $C_{II}$ of FIGS. 9A and 9B, respectively.
Figure 10B:
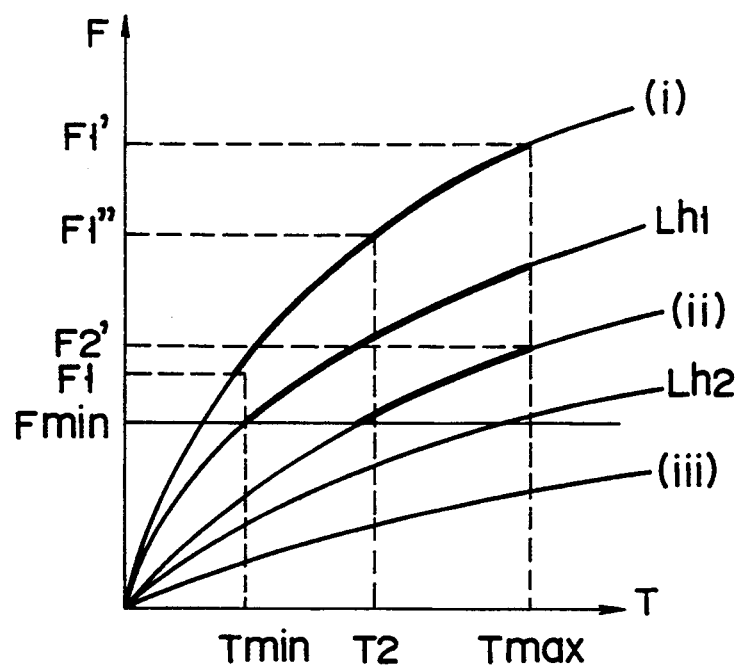

When the maximum luminance Lh meets the relation $Lh_1 < Lh$ as shown by (i) in FIG. 10B, the exposure time T will be in the range $T_{min} \leq T \leq T_{max}$ and the diaphragm opening will be $F_1 \leq F \leq F_1'$. Similarly, when the maximum luminance Lh is in the range $Lh_2 \leq Lh \leq Lh_1$ as shown by (ii), the exposure time T will be in the range $T_2 \leq T \leq T_{max}$, and the diaphragm opening will be in the range $F_{min} \leq F \leq F_2'$. Furthermore, when the maximum luminance Lh meets the condition $Lh < Lh_2$, there will be no T and F fulfilling the condition $C_{II}$. The FT condition detecting circuit 645 supplies the individual states (i), (ii), and (iii) as the aforementioned state signal $C_{FT}$ to the parameter setting circuit 644.

In this way, based on the condition $C_{II}$ shown in FIG. 10B, the abscissa (T) of the condition $C_I$ shown in FIG. 10A is determined. For example, when $T_{min} \leq T \leq T_{max}$ in state (i), the imaging dynamic range DR can increase up to the $DR_1$ and for the exposure time $T = T_{max}$, it can be raised up to $DR_3$. When $T_2 \leq T \leq T_{max}$ in state (ii), the imaging dynamic range DR falls on the shaded portion of FIG. 10A. In the portion, the maximum number of accumulations n enables the imaging dynamic range to be increased up to $DR_2$ when $T = T_2$.

Figure 11A:
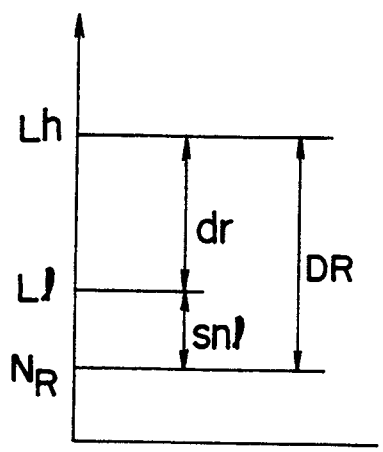
FIGS. 11A through 11C are conceptual views for explaining the dynamic range and others according to conditions $C_I$ and $C_{II}$.
Figure 11B:
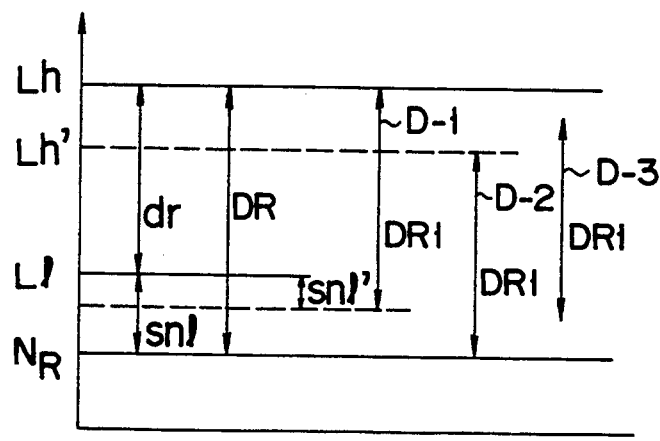
Figure 11C:
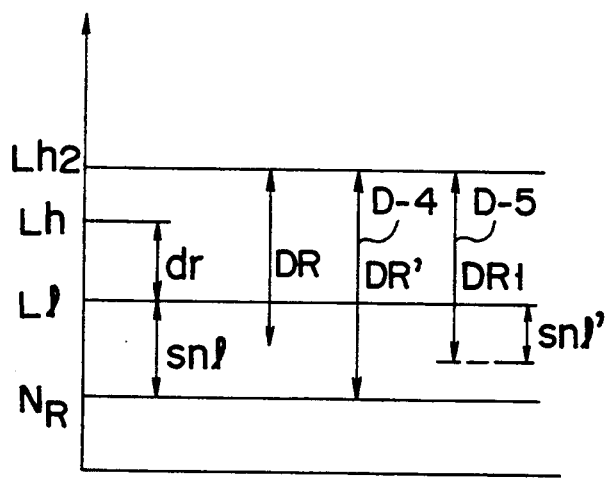

FIGS. 11A through 11C are conceptual views for explaining the dynamic range and others according to the conditions $C_I$ and $C_{II}$. FIG. 11A illustrates a case where both conditions $C_I$ and $C_{II}$ are met, FIG. 11B a case where only condition $C_I$ is met, and FIG. 11C a case where condition $C_{II}$ is not met. In each figure, the ordinate corresponds to luminance. The $DR_1$ shown here is assumed to be the possible maximum dynamic range in each state.

In FIG. 11A, the dynamic range DR is as wide as from $N_R$ to Lh. In FIG. 11B, when F and T remain unchanged, the maximum luminance that can be photographed also remain unchanged. In this case, there are three options: option D-1: S/N changes from snl to snl'; option D-2: snl is maintained without using the high luminance side; and option D-3: a value between D-1 and D-2 is used. In the case of D-2, Lh' is assumed to be equal to or greater than $F_{min}^2 k/T_{max}$. Furthermore, in FIG. 11C, there are two options: option D-4: the imaging dynamic range is increased from DR to DR'; and D-5: S/N changes from snl to snl'.

Depending on the photographing mode, the following mode setting is done:

Mode A: the number of accumulations is decreased to a minimum.

Mode B: the number of accumulations is kept at a constant value ($n_C$).

Mode C: the aperture opening F is decreased to a minimum, and n is minimized to shorten the photographing time.

Based on those conditions, the most suitable n, F, and T are set for each state and mode as listed in FIG. 12. Three parameters n, F, and T are listed for examples of states (i) and (ii) because only these states allow more than one combination of those three parameters.

Under such a principle, in the embodiment, depending on the dynamic range, the luminance, and the desired photographing mode of the subject, the most suitable number of accumulations n, diaphragm opening F, and exposure time T are set at the condition setting circuit 64. Based on these parameters, the accumulator circuit 56 performs accumulation. The signal Sn from the accumulator circuit 56 is free from FPN because the FPN-storing ROM 50 and subtracter 48 subtracts FPN of the CCD imaging element 38 from the signal before accumulation. Therefore, it is possible to obtain the signal having the dynamic range represented by equation (5). The signal Sn undergoes various processes including luminance conversion and encoding as proposed in Published Unexamined Japanese Patent Application No. 63-232591, at the image processing circuit 60, and then is written into the recording medium 62.

While in the embodiment, the diaphragm opening F is set to a minimum value $F_{min}$ and cannot be reduced further, an insufficient amount of light may be supplemented by suitable illumination.

In the embodiment, the light from the subject is introduced directly to the luminance detector by using the half mirror and others, but it may be directed in other ways. For example, an additional finder system may be used.

Although three types of photographing modes are used in the embodiment, other modes may be used. For example, the highest priority may be given to lowering the depth of field or to shortening the exposure time T.

In addition, the maximum luminance Lh and minimum luminance L1 may be obtained from a single point of the image or the average value of several points.

Since dark current noise changes much with temperature, a temperature sensor may be used to sense dark current more accurately. Furthermore, the imaging element may be cooled to suppress dark current noise, providing an even wider dynamic range.

Additionally, the condition setting circuit of FIG. 3 may be constructed of a ROM that receives Lh, L1, and snl as inputs and supplies n, F, and T as outputs.

Referring to FIGS. 13 through 16, a second embodiment of the present invention will be explained. In the embodiments described below, the same parts as those in the first embodiment are indicated by the same reference characters and their explanation will be omitted to avoid repetition.

FIG. 13 is a schematic block diagram for the entire electronic camera to which an exposure control circuit of an image input device according to a second embodiment of the present invention. In the figure, there is a subject luminance detector 72 instead of the luminance detector of FIG. 2.

Figure 14:
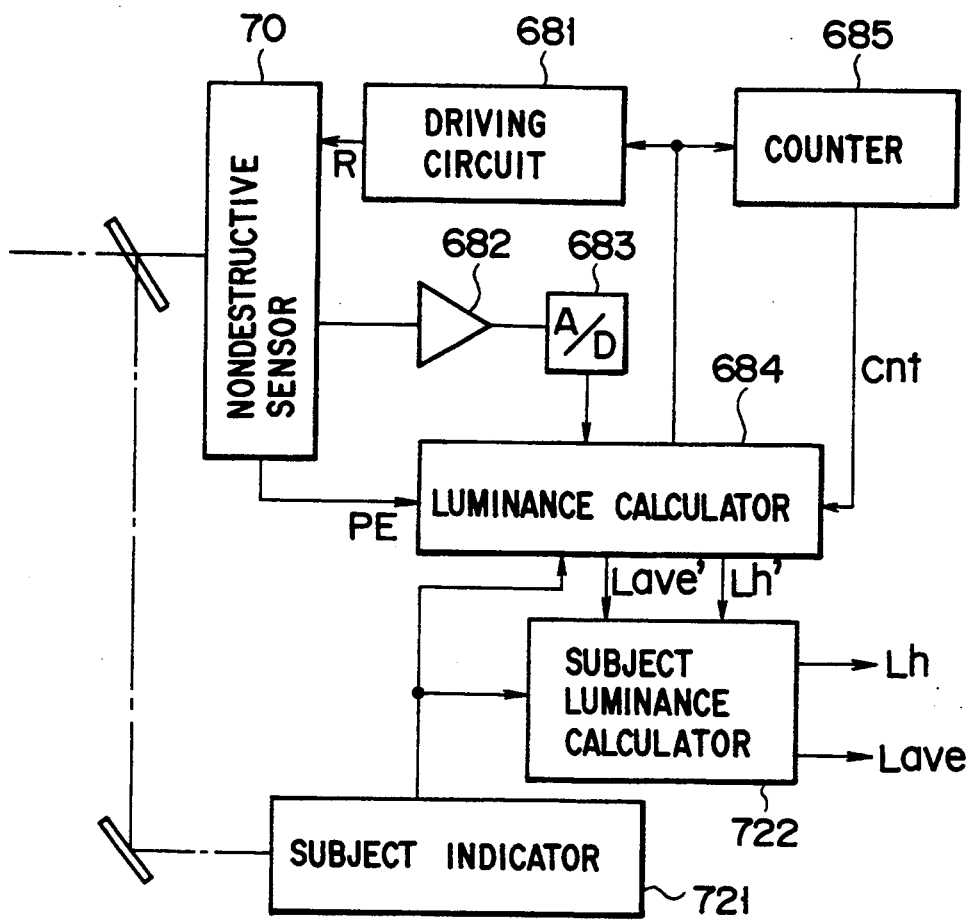
FIG. 14 is a detailed block diagram for the subject luminance detector of FIG. 13.

FIG. 14 is a detailed block diagram of the subject luminance detector 72. In the figure, a subject indicator 721 is composed of, for example, a finder and a button.

When the button is pressed, the subject, which is viewed at the center of the finder and located on the optical axis of the photography optical system 30, is photographed, and its luminance is supplied from a luminance calculator 684. The luminance calculator 684, using the signal whose peak value is saturated, supplies the maximum luminance Lh' and average value Lave' to a subject luminance calculator 722. Based on the maximum luminance Lh' and average value Lave', the subject luminance calculator 722 detects the maximum luminance Lh of the image to be photographed and average value Lave of the subject.

The subject luminance calculator 722 makes a comprehensive judgment on the luminance of more than one subject specified by the subject indicator 721, and then supplies the maximum luminance Lh and the average luminance Lave of the subjects. For example, if $Lave_i$ and $lh_i$ are specified for j types of subject where $i=1$ through j, Lh and Lave are obtained as follows:

$$Lh = \text{the maximum value of } Lhi \quad (15)$$

$$Lave = \left( \sum_{i=1}^{j} Lave_i \right) / j$$

Now, the operation of the second embodiment will be explained.

Figure 15:
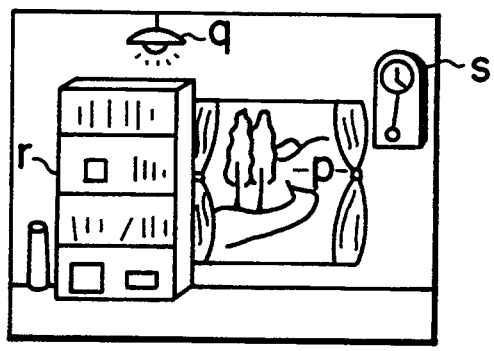
FIG. 15 is a view of the subject seen through the finder.

For example, as shown in FIG. 15, a view outside the window is assumed to be photographed from inside the room. The individual subjects indicated by p, q, r, and s are also assumed to have the following luminance:

| p | view outside window | Lh1 | $Lave_1$ |
| q | lamp | Lh2 | $Lave_2$ |
| r | bookcase | Lh3 | $Lave_3$ |
| s | clock | Lh4 | $Lave_4$ |

Figure 16:
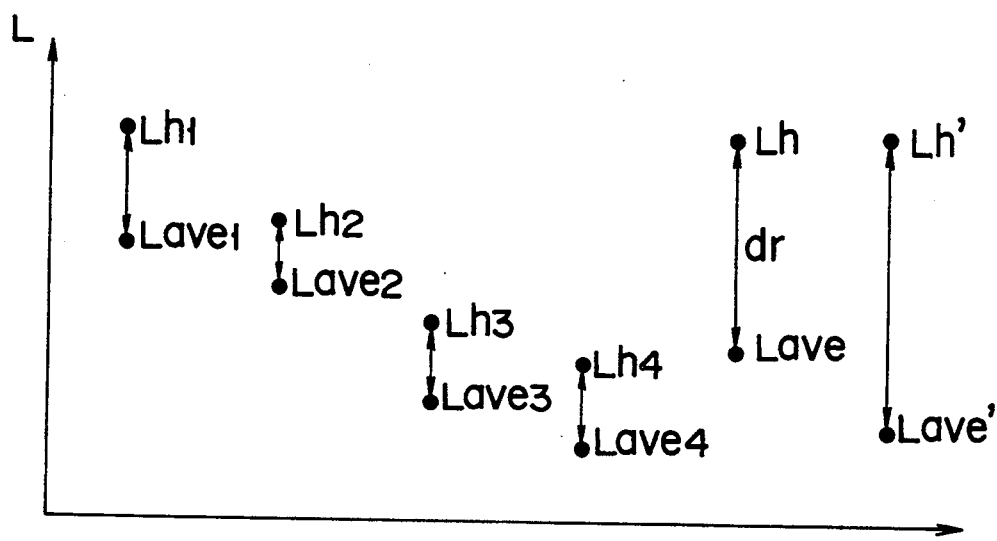
FIG. 16 is a conceptual view for explaining the maximum luminance value and average value of the subject of FIG. 15.

When the subject indicator 721 specifies the individual subjects sequentially, the maximum luminance Lh and average value Lave can be represented as shown in FIG. 16.

The Lh and Lave calculated at the subject luminance calculator 722 is supplied to the condition setting circuit 64. Then, the processing proceeds in the same manner as with the first embodiment and Lave is set in place of L1. When the imaging dynamic range is $DR > DR_1$, as shown in FIG. 11B, to give the first priority to the S/N on the low luminance side, the imaging dynamic range is set as shown by D-2 in the figure. In this way, ensuring the S/N ratio properly makes it possible to take a good photograph of the most desired subject (the primary subject).

In the second embodiment, as shown in FIG. 16, because Lave is larger than the average values $Lave_3$ and $Lave_4$ of bookcase q and clock r, the S/N ratio needed for these two subjects are not necessarily assured. This problem can be solved by specifying those subjects more than once at the subject indicator 721. For example, when the outside view p is specified once, the lamp q once, the bookcase twice, and the clock four times, then the maximum luminance and average luminance will be Lh' and Lave' as shown in FIG. 16, ensuring both the S/N ratios of the bookcase and clock.

Thus, according to the present embodiment, specifying the desired image enables the parameters n, F, and T to be set so as to provide the best photograph of the primary subject, before photographing starts.

In the second embodiment, a line sensor is used for the subject luminance detector 72, but use of an area sensor makes it possible to specify the subject without moving the photography optical system.

The luminance calculator 684 detects the maximum luminance Lh' and average Lave' of the subject, but another approach may be possible. For example, like the first embodiment, the minimum luminance may be first detected and based on the minimum luminance, the parameters n, F, and T may be set.

In the first and second embodiments, the half mirror 32 and full reflection mirror 66 are provided to obtain the luminance of the subject. Use of those members, however, increases the size of the optical system, resulting in a larger device as a whole. To overcome this drawback, an embodiment explained below does not use those members.

Figure 17:
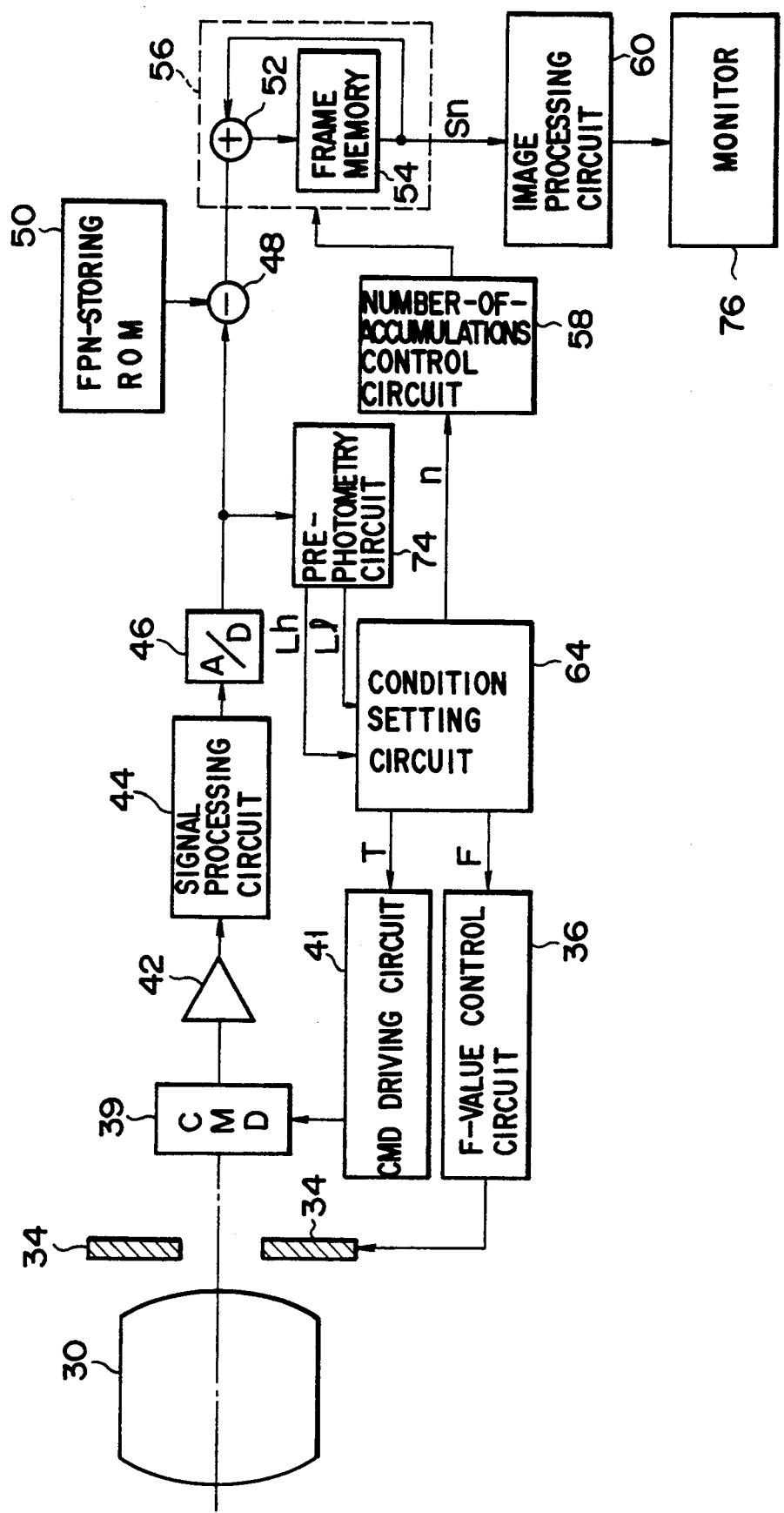
FIG. 17 is a block diagram showing an electronic camera having an exposure control circuit according to a third embodiment of the present invention.

In FIG. 17, numeral 74 indicates a pre-photometry circuit that is alternative to the luminance detector 68 in the first embodiment or the subject luminance detector 72 in the second embodiment. This circuit receives the output signal from the A/D converter 46 and supplies the maximum value Lh and minimum value L1 to the condition setting circuit 64.

The third embodiment differs from the first and second embodiments in that an imaging element allowing high-speed read such as a CMD (Charge Modulation Device) 39 and a CMD driving circuit 41 are used instead of the CCD imaging element 38 and that the output of the image processing circuit 60 is supplied to the monitor 76. Because the rest is the same as that of the first and second embodiments, their explanation will be omitted.

The operation of the third embodiment will now be described. The image signal produced at the CMD 39 is read at a high speed, A/D-converted, and supplied to the pre-photometry circuit 74. The pre-photometry circuit 74 detects the maximum value Lh and minimum value L1 of the input signal and supplies these values to the condition setting circuit 64.

The condition setting circuit 64 judges whether or not the maximum value Lh is saturated, and shortens the exposure time T or makes the diaphragm opening wider when it is saturated. When the maximum value Lh is not saturated, the exposure time T is made longer or the diaphragm opening narrower. This action is performed each time the signal is read from the CMD 39. Because the signal is read at a high speed from the CMD 39 to be adjusted to expression (16), the time required for the adjustment is extremely short: The maximum value of the signal≃the saturated value (16)

Based on the minimum L1 of the read signal, the dynamic range dr [dB] of the subject is determined, using equation (9). To detect Lh and L1, image signals can be repeatedly read out in nondestructive way during each exposure period, as in the luminance detector 33 of the first embodiment.

In the present embodiment, the units of the maximum value Lh and minimum value L1 are those of luminance after A/D conversion, and differ from the units [$cd/m^2$] used in the first and second embodiments.

The imaging dynamic range is determined using equation (10). As with the first and second embodiments, the exposure time T, the aperture opening F, and the number of accumulations n are set.

In this way, the exposure time T, the diaphragm opening F, and the number of accumulations n are set, and the signal Sn accumulated n times undergoes luminance conversion at the signal processing circuit 60 and is supplied to the monitor 76.

In the present embodiment, use of the high-luminance imaging element can reduce the time required for n accumulations to less than one frame time of NTSC. This makes it possible to observe the image with a wide dynamic range on the monitor 76 with natural movement, even when a moving image is filmed.

In the present embodiment, use of the pre-photometry circuit that performs photometry of the readout signal eliminates members separating the optical path of the optical system. Therefore, it is possible to make the entire system more compact.

Since the CMD allows random access, by limiting the read position during pre-photometry to the desired small area, it is possible to further shorten the time required to set the conditions.

A fourth embodiment of the present invention will be explained which detects FPN to be subtracted for each photographing.

It is known that FPN is highly dependent on temperature and its value varies greatly depending on use environment. Even at the same temperature, FPN can change due to clock noise or the like. As the number of accumulations n increases, FPN also increase accordingly, so that an exact subtraction of FPN only is very important to obtain a wide dynamic range. For this reason, in the fourth embodiment, storage of FPN is carried out during photographing so that FPN may be subtracted accurately.

FIG. 18 is an overall block diagram for an electronic camera to which an exposure control circuit of an image input device according to the fourth embodiment of the present invention is applied. In the figure, unlike the first embodiment, there are a mechanical shutter 78 immediately before the CCD imaging element 38 and a shutter control device 80 and an FPN storing changeover switch 82. The shutter 78 may be inserted into the optical system 30. The remaining part of the figure is the same as those in the foregoing embodiments, so that the same parts are indicated by the same reference characters and their explanation will be omitted.

Now, the operation of the fourth embodiment will be explained. When photographing starts, the controller (not shown) controls the shutter control device 80 so as to close the shutter 78. The FPN-storing changeover switch 82 changes over to position a in the figure, at the same time that the shutter 78 cuts off light. Then, the signal read after one frame time of exposure is A/D-converted and stored in the FPN storing ROM 50. In the next frame, the shutter 78 is opened, the subject light from the optical system 30 is projected on the CCD imaging element 38, and at the same time, the FPN-storing changeover switch 82 is switched to position b. In this way, as with the first embodiment, the photographing is performed.

As noted above, storing FPN immediately before photographing makes it possible to subtract FPN accurately. In the present invention, one frame of exposure is used for FPN, but because the actual exposure time T provides a more accurate result, the following approach may be possible.

In this approach, since the luminance detector 68 still receives the subject light even when the shutter 78 is closed, the condition setting circuit 64 calculates the exposure time T, the diaphragm opening F, and the number of accumulations n for photographing on the basis of the outputs Lh and L1 from the detector 78. On this exposure time T, the CCD imaging element 38 is exposed and the read-out signal is stored in the FPN-storing ROM 50.

While in the embodiment, a signal from a single photographing with light shut off is used as FPN, a signal obtained by accumulating signals from more than one photographing with light shut off may be used as FPN.

In the embodiment, a CCD is used as the imaging element, but other suitable devices may be used. For example, a CMD (Charge Modulation Device) may be used.

Figure 19:
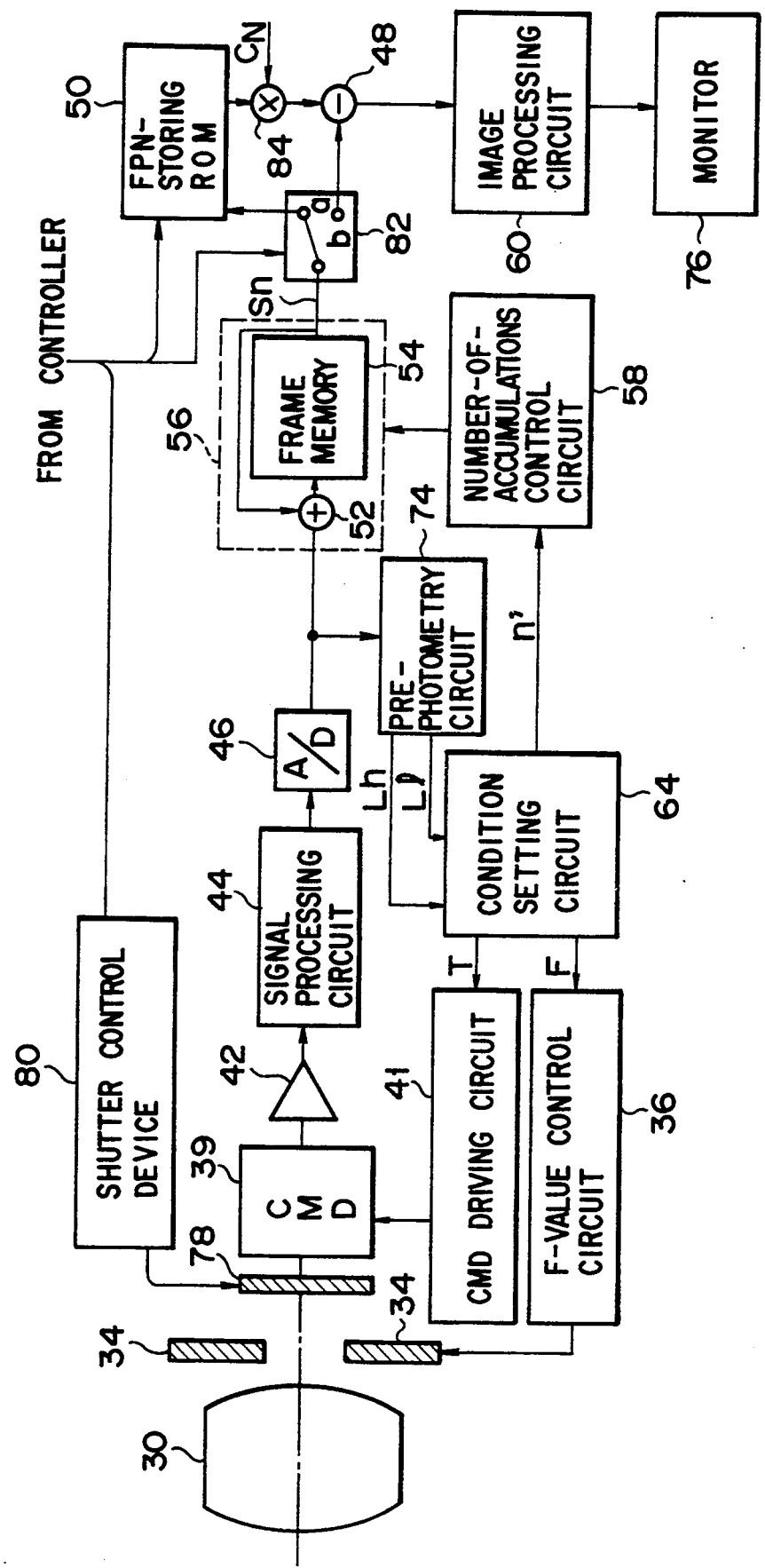
FIG. 19 is a block diagram showing an electronic camera having an exposure control circuit according to a fifth embodiment of the present invention.

FIG. 19 is a block diagram of a fifth embodiment according to the present invention. This embodiment is constructed of the third embodiment further containing an FPN detecting function based on accumulation.

In the embodiment, the output of the accumulator 56 is stored as FPN, which is multiplied by coefficient $C_N$ at the multiplier 84 and undergoes subtraction during photographing. The coefficient $C_N$ is a correction coefficient when the number of accumulations in storing FPN differs from that in photographing. For example, if the number of accumulations in storing FPN is $N_{FPN}$ and the number of accumulations in photographing is $n'$, the following relation holds:

$$C_N = \frac{n'}{N_{FPN}} \quad (17)$$

Detection of FPN according to the number of accumulations provides more accurate FPN. Additionally, use of an imaging element allowing high-speed read makes it possible to detect FPN in a short time.

In the fourth and fifth embodiments, FPN detection is performed under the conditions where the subject light is completely shut out by the shutter 78. Use of such a mechanical shutter means usually makes the entire system larger. Therefore, instead of providing such a mechanical shutter, the signal obtained from photographing with the shortest exposure time of the imaging element and the largest aperture opening F may be used as FPN.

Additionally, when the maximum value of the aperture opening is infinitely great ($\infty$ with the aperture opening $F_{close}$ and the amount of incident rays zero), of course, it may be used as the shutter.

Figure 20:
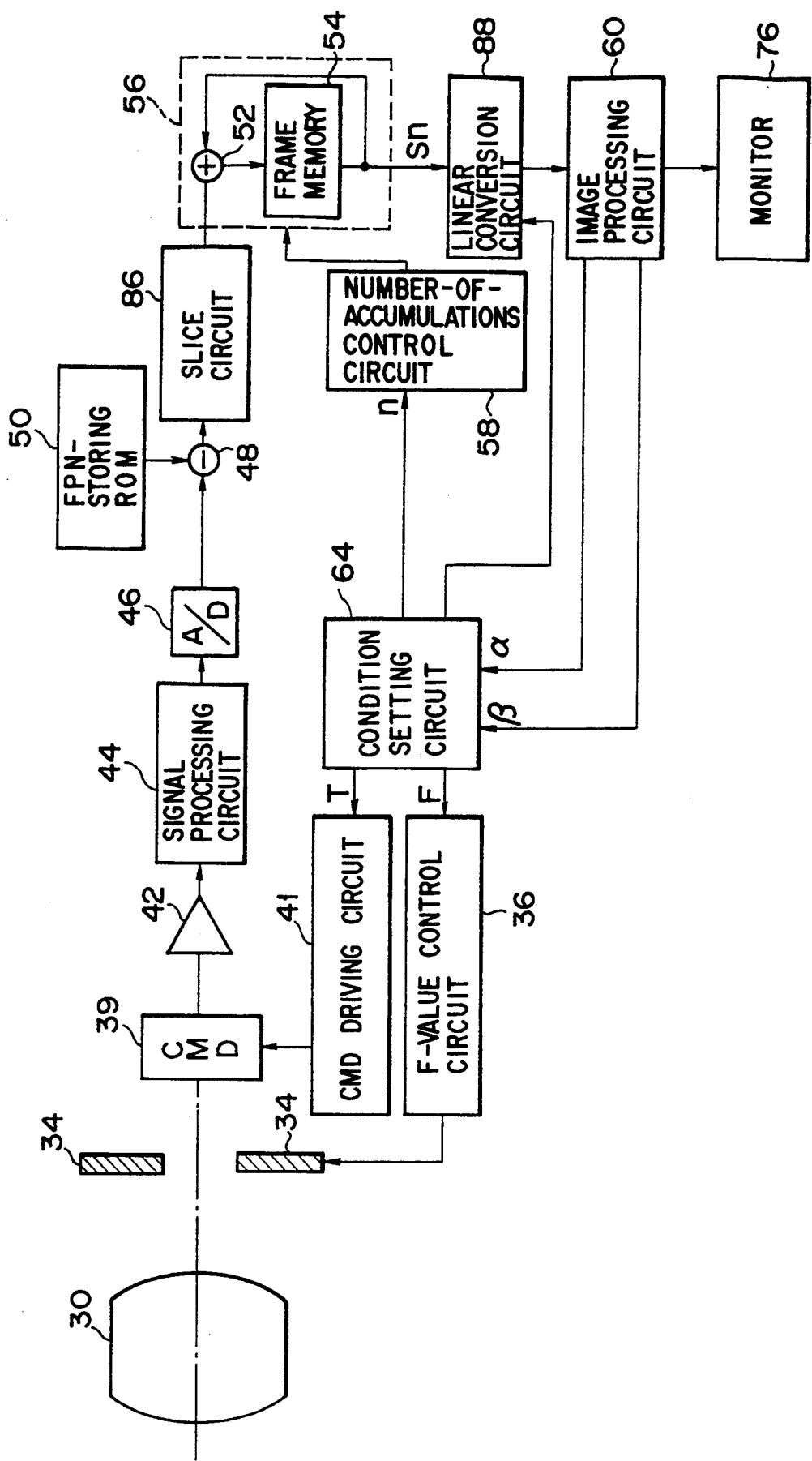
FIG. 20 is a block diagram showing an electronic camera having an exposure control circuit according to a sixth embodiment of the present invention.

Referring to FIG. 20, a sixth embodiment of the present invention will be explained. This embodiment employs a nondestructive solid-state imaging element or CMD (as shown in FIG. 20) and obtains a plurality of images with different exposure times during one exposure period.

Figure 1:
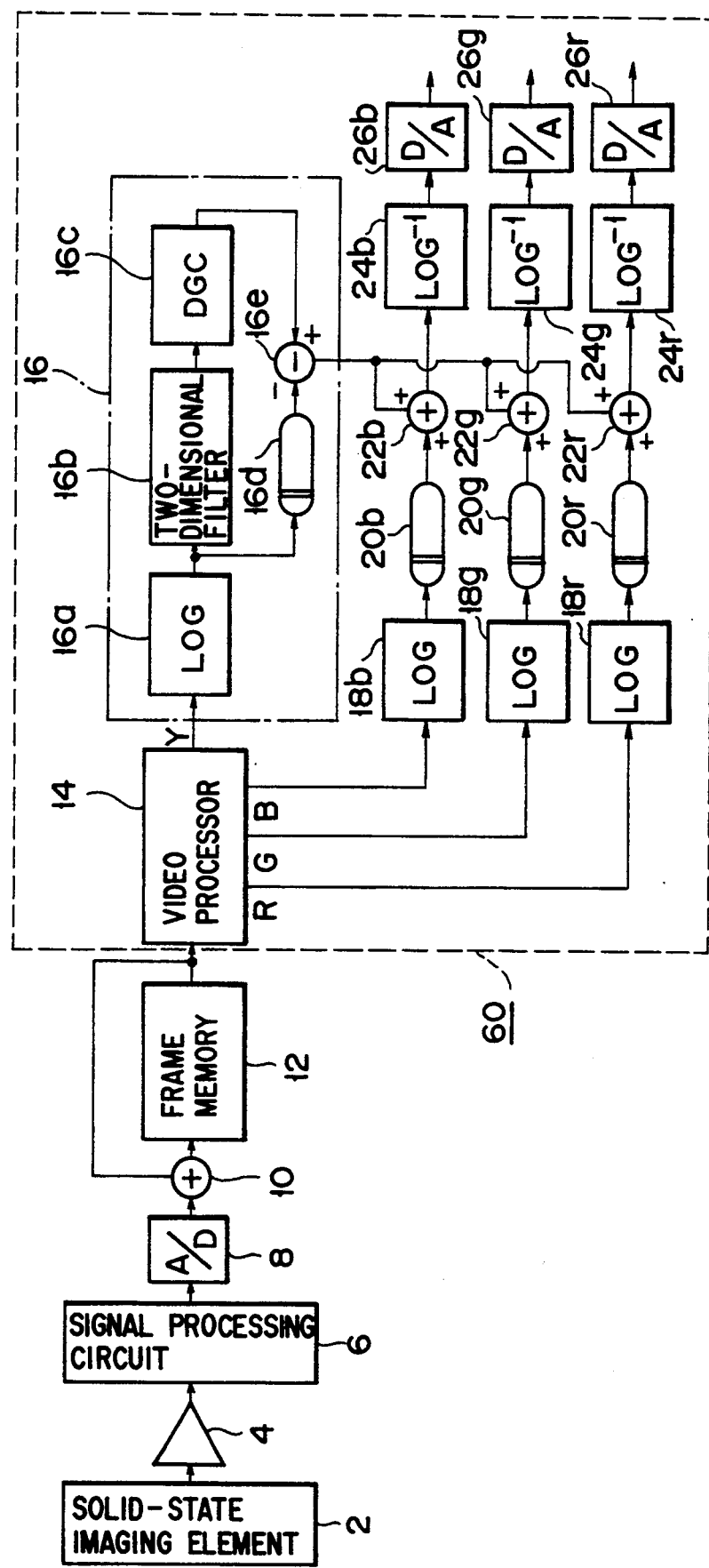
FIG. 1 is a schematic diagram for an important part of an electronic camera of the prior art.

The image processing circuit 60 used in the embodiment of FIG. 20 comprises the components 14 to 26 of shown in FIG. 1 (prior art). Nevertheless, according to the invention, the circuit 60 is not limited to this type.

In the block diagram of FIG. 20, as with the third embodiment, the CMD 39 is used as a nondestructive read imaging element. A slice circuit 86 is connected between the subtracter 48 and the accumulator 56 and a linear conversion circuit 88 is connected between the subtracter 48 and the accumulator 56 and the image processing circuit 60.

Nondestructive readout by the CMD 39 will be described, referring to FIG. 21. In the figure, at time "0", reset (RST on the time axis) is carried out to start the accumulation of charges. When a period of time $t_1$ has elapsed, signal readout (READ) is performed. Then, when another period of time $t_2$ has elapsed, the signal is read out. The read-out data is the signal obtained from the exposure during the time interval of $T_1+T_2$. That is, the data will not be lost unless reset operation is done when the signal is read out at $t_1$. When time $t_2$ has passed, the signal is read out and reset is performed, which makes the accumulated charges disappear.

In this way, by performing only readout without reset, it is possible to read out a plurality of images with different exposure times during one exposure period.

In the operation, the signal from the CMD 39 is amplified at the preamplifier 42 and then undergoes various processes including clamping, followed by analog-to-digital conversion at the A/D converter 46. The resulting digital data is made free from FPN at the subtracter 48. This FPN-free signal is clipped at the slice circuit 86 and accumulated at the accumulator 56.

FIG. 22 shows data accumulated at the accumulator 56 when five readouts are performed during one exposure period. In the figure, the photoelectric conversion characteristics are such that $f_1$ has the longest exposure time and $f_5$ is the shortest exposure time.

The photoelectric conversion characteristic outputs $f_1$ through $f_5$ are assumed to be sliced at a level of $V_1$ at the slice circuit 86. The outputs $f_1$ through $f_5$ are accumulated at the accumulator 56 to provide the photoelectric conversion characteristics shown by $F_0$ in the figure. When nondestructive read is not performed, the amount of light as little as shown by, for example, $L_1$ is reproduced during one exposure period. With the present embodiment, however, it is possible to photograph the amount of light $L_5$ much greater than $L_1$.

Because the accumulated data is nonlinear as represented by $F_0$, it is converted so as to be linear as shown by $F_1$ at the linear conversion circuit 88. The linear data is further converted at the image processing circuit 60 into a suitable signal for the monitor 76 and then is supplied to the monitor 76.

While in the previous embodiment, the pre-photometry circuit 74 is provided to sense luminance, in the present embodiment, the luminance signal is sensed through matrix conversion at the video processor 14 in the image processing circuit 60. The image processing circuit 60 is provided with a dynamic range gain detecting circuit 16c (hereinafter, referred to as the DGC) of FIG. 1.

Figure 23:
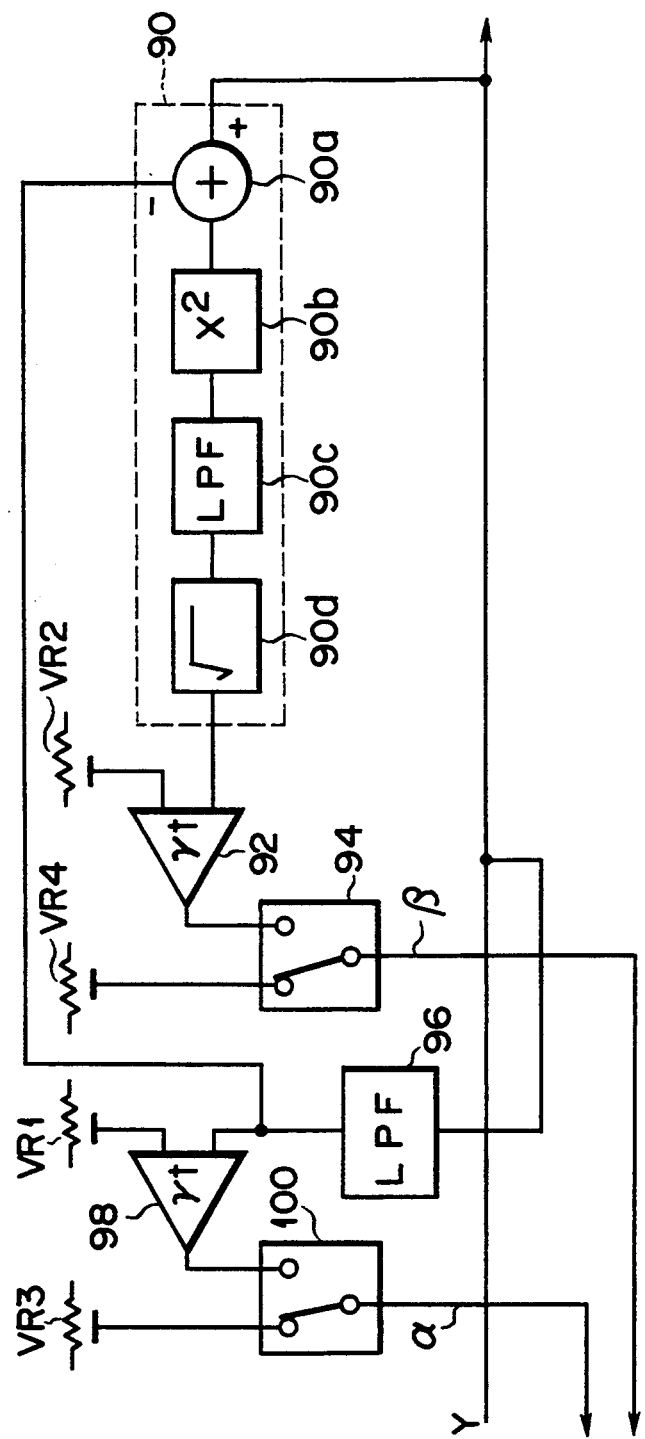
FIG. 23 is a block diagram showing the dynamic range gain detecting circuit incorporated in the electronic camera shown in FIG. 1.

The circuit diagram of the DGC 16c is shown in FIG. 23. Numeral 90 indicates a standard deviation generating circuit, which is provided with an adder 90a, a square-law detector 90b, an LPF 90c, and a square-root circuit 90d. The output of the standard deviation generating circuit 90 is supplied to one input of a comparator amplifier 92, the other input of which is connected to a variable resistor VR2, and then is compared with a reference voltage and the resulting signal is amplified. The output of the comparator amplifier 92 is supplied to one input of a changeover switch 94, the other output of which is connected to a variable resistor VR4, and then is supplied as a dynamic range adjust voltage $\beta$ after changeover to automatic control or manual control.

An LPF 96 is provided to calculate the average value of luminance signals, whose output is compared with a gain reference voltage at a comparator amplifier 98 connected to a variable resistor VR1. By switching between the gain setting voltage set by a variable resistor VR3 and the output of the comparator amplifier 98 with a changeover switch 100, automatic control or manual control is selected and a gain adjusting voltage $\alpha$ is supplied.

With such a configuration, the DGC 16c can produce the signals of $\alpha$ and $\beta$ from Y (the luminance signal). The outputs $\alpha$ and $\beta$ correspond to the average value and standard deviation of the image, respectively. The $\alpha$ and $\beta$ are supplied to the condition setting circuit 64 for control of the diaphragm opening and exposure time. The explanation of the operation of the DGC 16c will be omitted, because U.S. Pat. No. 4,926,247 (Published Unexamined Japanese Patent Application No. 63-232591) gives a detailed explanation of it. Since fine setting of diaphragm opening and exposure time complicates linear processing, it is desirable to control the diaphragm opening and exposure time under predetermined setting conditions. These setting conditions are supplied to a linear conversion circuit 88 that then performs linear conversion.

With those operations, a plurality of image data can be accumulated at a high speed to provide a wide dynamic range signal. Because an optimum exposure is set at the diaphragm 34 for a wide dynamic range signal, the exposure time can be optimized.

Although not shown in the present embodiment, when the clamp circuit prior to the A/D converter 46 is unstable, the signal may be clamped after A/D conversion.

In this way, by reading out image data as many times as required during one exposure time, it is possible to photograph the subject in a wide range of luminance. Alternatively, the nondestructive read of image signal is replaced overcome exposure periods, and the exposure amount is then reset.

The color imaging device used in the present invention is disclosed in U.S. Pat. No. 4,926,247, and will not be described in detail here.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image sensing apparatus having an exposure level and dynamic range control circuit, for use in an image input device having an exposure system that produces an electronic image input signal of a subject, said image sensing apparatus comprising:

light-amount adjusting means for adjusting an amount of incident light received from the subject;

solid-state imaging element means for (1) enabling a reading of an image included in said incident light, (2) generating the electronic image input signal of the subject and (3) controlling an exposure time of said exposure system;

accumulating means, including addition means, for accumulating by addition a plurality of image signals read by said solid-state imaging element means;

number-of-addition control means for controlling how many additions are performed by said addition means of said accumulating means; and condition setting means for (1) setting said light-amount adjusting means so as to selectively set an amount of incident light, (2) setting said solid-state imaging element means so as to selectively set an amount of exposure time, and (3) setting said number-of addition control means so as to selectively set how many additions are performed by said addition means of said accumulating means, according to one of a luminance of said subject as represented by said electronic image input signal of said subject, and conditions set by said condition setting means.

2. An apparatus according to claim 1, further comprising:

luminance detecting means, responsive to said electronic image signal of said subject, for detecting the luminance of said subject and for providing a detected luminance output signal; and said condition setting means setting said light-amount adjusting means, said solid state imaging element means, and said number-of-addition control means so as to selectively adjust said amount of incident light, said exposure time, and said number of additions to be performed by said addition means of said accumulating means based on the luminance of said subject detected by said luminance detecting means.

* * * * *

UNITED STATES PATENT AND TRADEMARK OFFICE
CERTIFICATE OF CORRECTION

PATENT NO. : 5,335,075
DATED : August 2, 1994
INVENTOR(S) : KOMIYA, Yasuhiro It is certified that error appears in the above-identified patent and that said Letters Patent is hereby corrected as shown below:

Title page:

Section [19], after "Komiya", delete "et al"

Section [75] Inventors,

"Yasuhiro Komiya; Takeshi Mori, both of Tokyo; Tatsuo Nagasaki, Yokohama, all of Japan"

should read

--Yasuhiro Komiya, of Tokyo Japan--

Signed and Sealed this

Fourteenth Day of February, 1995

*Attest:*

BRUCE LEHMAN

*Attesting Officer*   *Commissioner of Patents and Trademarks*